US012665268B2

(12) United States Patent
Chen et al.

(10) Patent No.: US 12,665,268 B2
(45) Date of Patent: Jun. 23, 2026

(54) ELECTRODE STRUCTURE, RECHARGEABLE BATTERY AND METHOD FOR JOINING BATTERY TAB STACK TO ELECTRODE LEAD FOR THE SAME

(71) Applicant: INDUSTRIAL TECHNOLOGY RESEARCH INSTITUTE, Hsinchu (TW)

(72) Inventors: Kun-Tso Chen, Kaohsiung City (TW); Tsung-Ying Tsai, Tainan City (TW); Tsai-Chun Lee, Tainan City (TW); Chih-Wei Chien, Tainan City (TW); Hui-Ta Cheng, Tainan City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 684 days.

(21) Appl. No.: 18/071,518

(22) Filed: Nov. 29, 2022

(65) Prior Publication Data

US 2024/0145878 A1 May 2, 2024

(30) Foreign Application Priority Data

Oct. 28, 2022 (TW) .................................. 111141029

(51) Int. Cl.
*H01M 50/538* (2021.01)
*H01M 50/46* (2021.01)
*H01M 50/536* (2021.01)

(52) U.S. Cl.
CPC ......... *H01M 50/538* (2021.01); *H01M 50/46* (2021.01); *H01M 50/536* (2021.01)

(58) Field of Classification Search
CPC ... H01M 50/536; H01M 50/538; H01M 50/46
See application file for complete search history.

(56) References Cited

U.S. PATENT DOCUMENTS

| | | | |
|---|---|---|---|
| 9,142,825 | B2 | 9/2015 | Cho et al. |
| 9,490,464 | B2 | 11/2016 | Ahn |
| 10,826,049 | B2 | 11/2020 | Wen et al. |
| 11,095,004 | B2 | 8/2021 | Tao et al. |

(Continued)

FOREIGN PATENT DOCUMENTS

| | | |
|---|---|---|
| CN | 102447088 A | 5/2012 |
| CN | 103125033 A | 5/2013 |

(Continued)

OTHER PUBLICATIONS

TW Office Action dated Aug. 4, 2023 as received in Application No. 111141029.

(Continued)

*Primary Examiner* — Kenneth J Douyette
(74) *Attorney, Agent, or Firm* — Maschoff Brennan

(57) ABSTRACT

An electrode structure of rechargeable battery includes a battery tab stack, an electrode lead, a welding protective layer and a welding seam. The battery tab stack is formed by extension of a plurality of electrode sheets. The electrode lead is joined to one side of the battery tab stack. The welding protective layer is joined to another side of the battery tab stack opposite to the electrode lead. The welding seam extends from the welding protective layer to the electrode lead through the battery tab stack.

2 Claims, 8 Drawing Sheets

(56) References Cited

U.S. PATENT DOCUMENTS

| 2017/0237133 A1* | 8/2017 | Marple | H01M 6/188 |
| | | | 429/406 |
| 2020/0028144 A1* | 1/2020 | Wen | H01M 50/553 |
| 2021/0135321 A1 | 5/2021 | Chen | |
| 2023/0013864 A1 | 1/2023 | Zhou et al. | |

FOREIGN PATENT DOCUMENTS

| CN | 203812967 U | 9/2014 |
| CN | 209786103 U | 12/2019 |
| CN | 110739434 A | 1/2020 |
| CN | 108465933 B | 4/2020 |
| CN | 211719697 U | 10/2020 |
| CN | 113097658 A | 7/2021 |
| CN | 113571847 A | 10/2021 |
| CN | 216085237 U | 3/2022 |
| TW | 446610 B | 7/2014 |

OTHER PUBLICATIONS

Das et al. "Blue laser welding of multi-layered AISI 316L stainless steel micro-foils" Optics and Laser Technology 132 106498 (Jul. 2020).

Bono et al. "Laser welding of copper and aluminium battery interconnections" Proceedings of SPIE vol. 9657 96570M-1 (Jul. 2015).

Grabman et al. "Laser welding of current collector foil stacks in battery production-mechanical properties of joints welded with a green high-power disk laser" Int J Adv Manuf Technol (2022) 118:2571-2586 (Oct. 2021).

* cited by examiner

ELECTRODE STRUCTURE, RECHARGEABLE BATTERY AND METHOD FOR JOINING BATTERY TAB STACK TO ELECTRODE LEAD FOR THE SAME

CROSS-REFERENCE TO RELATED APPLICATIONS

This application claims priority under 35 U.S.C. § 119(a) on Patent Application No(s). 111141029 filed in Taiwan, R.O.C. on Oct. 28, 2022, the entire contents of which are hereby incorporated by reference.

TECHNICAL FIELD

This present disclosure relates to an electrode structure, a rechargeable battery including the electrode structure and a method for joining battery tab stack to electrode lead for rechargeable battery.

BACKGROUND

Recently, the rechargeable batteries industry has been growing rapidly, and the future trend, especially electric vehicles, brings high market potential for lithium batteries. The batteries for high-end electric vehicles are required to feature small size, light weight, fast cooling, and a large amount of energy output in a short time period. Therefore, many domestic and foreign manufacturers are engaged in the development of rechargeable batteries.

Generally, a fundamental configuration of a rechargeable battery involves a battery core covered by an outer package. The battery core includes several positive electrode sheets and several negative electrode sheets which are arranged in a staggered manner, and an electrolyte is provided between adjacent electrode sheets. Each electrode sheet is also connected with a battery tab exposed outside the package. The battery tab is required to be joined to an electrode lead to be served as a terminal connection point for charging and discharging.

At present, the battery tabs are joined to the electrode lead by a two-step welding processes. The battery tabs are firstly joined together to form a tab stack by an ultrasonic welding process, and then the tab stack is joined to the electrode lead by a laser welding process.

SUMMARY

According to one embodiment of the present disclosure, an electrode structure of rechargeable battery includes a battery tab stack, an electrode lead, a welding protective layer and a welding seam. The battery tab stack is formed by extension of a plurality of electrode sheets. The electrode lead is joined to one side of the battery tab stack. The welding protective layer is joined to another side of the battery tab stack opposite to the electrode lead. The welding seam extends from the welding protective layer to the electrode lead through the battery tab stack.

According to another embodiment of the present disclosure, a rechargeable battery includes a battery core, a positive electrode structure and a negative electrode structure. The battery core includes a plurality of positive electrode sheets and a plurality of negative electrode sheets arranged in a staggered manner. One of the positive electrode sheets is separated from one of the negative electrode sheets by a separator. The positive electrode structure includes a positive battery tab stack, a positive electrode lead, a positive welding protective layer and a positive welding seam. The positive battery tab stack is connected with the positive electrode sheets. The positive electrode lead is joined to one side of the positive battery tab stack. The positive welding protective layer is joined to another side of the positive battery tab stack opposite to the positive electrode lead. The positive welding seam extends from the positive welding protective layer to the positive electrode lead through the positive battery tab stack. The negative electrode structure includes a negative battery tab stack, a negative electrode lead, a negative welding protective layer and a negative welding seam. The negative battery tab stack is connected with the plurality of negative electrode sheets. The negative electrode lead is joined to one side of the negative battery tab stack. The negative welding protective layer is joined to another side of the negative battery tab stack opposite to the negative electrode lead. The negative welding seam extends from the negative welding protective layer to the negative electrode lead through the negative battery tab stack.

According to still another embodiment of the present disclosure, a method for joining battery tab stack to electrode lead for rechargeable battery includes the following steps: providing a multilayer structure including a battery tab stack, a welding protective layer and an electrode lead; performing a lamination process; and performing a laser welding process. The welding protective layer and the electrode lead are located at opposite sides of the battery tab stack, respectively. The battery tab stack, the welding protective layer and the electrode lead are laminated. A laser is delivered along a direction from the welding protective layer toward the electrode lead to join the battery tab stack to the welding protective layer and the electrode lead.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
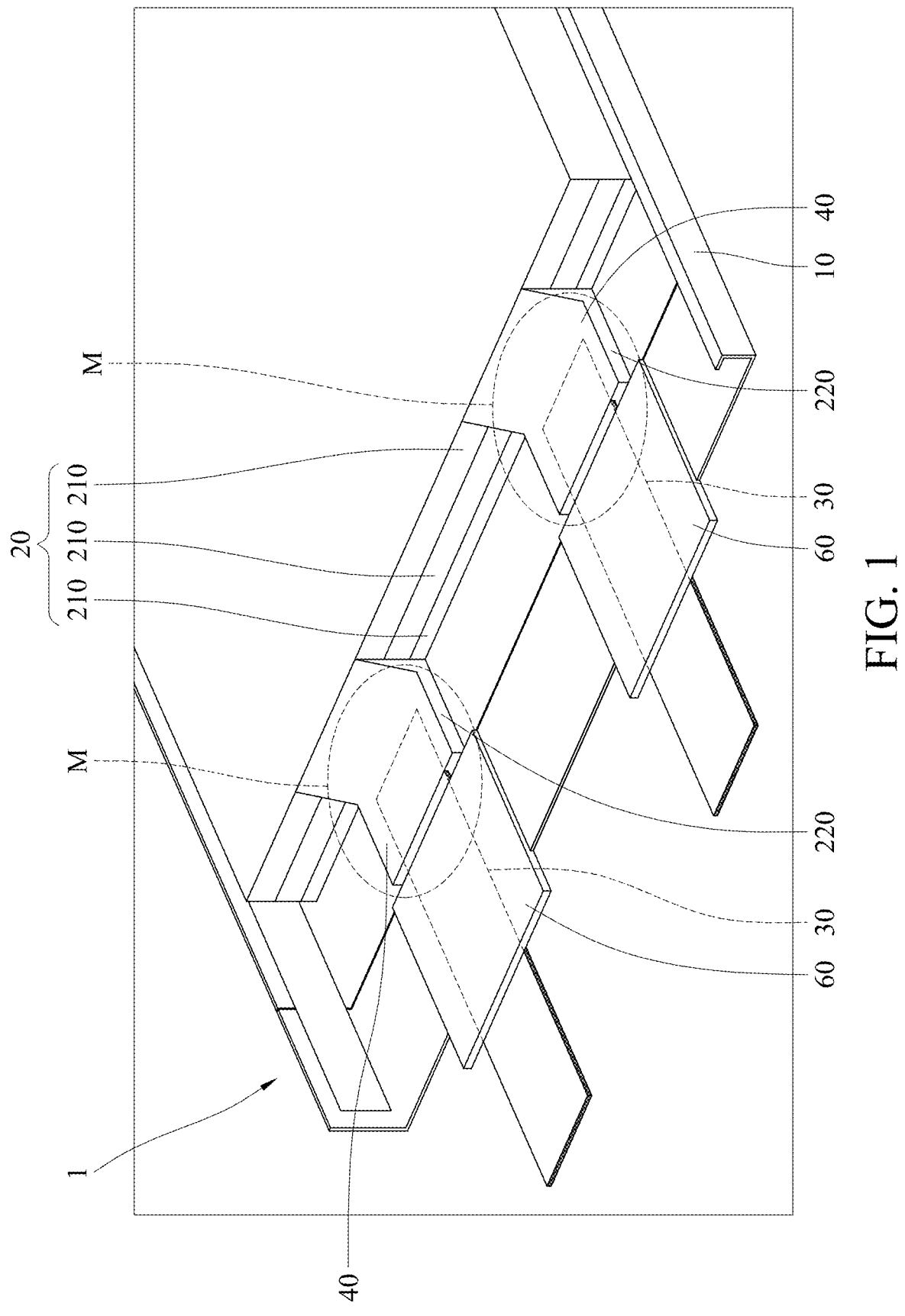
FIG. 1 is a schematic view of a rechargeable battery according to one embodiment of the present disclosure.
Figure 2:
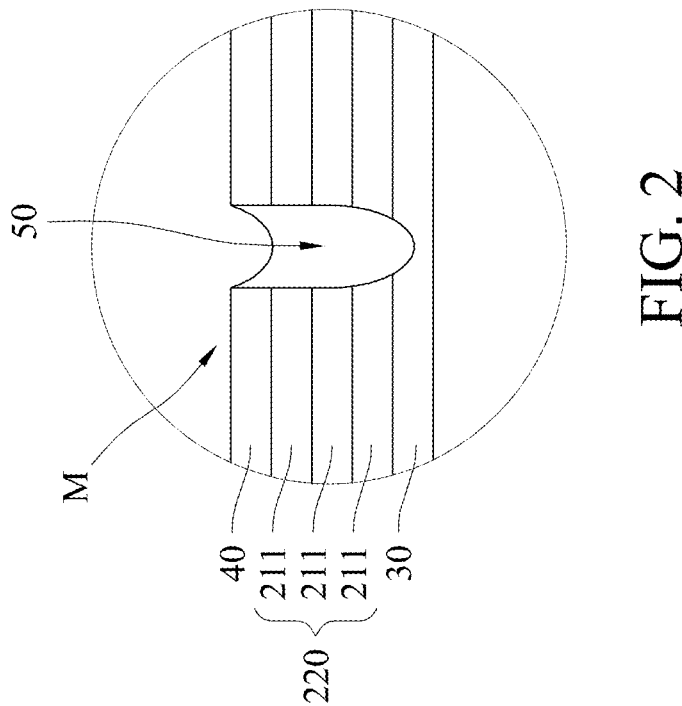
FIG. 2 is a schematic view of an electrode structure of the rechargeable battery in FIG. 1.

Please refer to FIG. 1 and FIG. 2. FIG. 1 is a schematic view of a rechargeable battery according to one embodiment of the present disclosure, and FIG. 2 is a schematic view of an electrode structure of the rechargeable battery in FIG. 1. In this embodiment, a rechargeable battery 1 may include a casing 10, a battery core 20 and two electrode structures M. The rechargeable battery 1 may be an aluminum-ion battery, a lithium-ion battery or other kinds of rechargeable battery. The casing 10 may be a soft package, for example but not limited to an aluminum laminated film cover. The battery core 20 is accommodated in the casing 10, and the battery core 20 may include a plurality of electrode sheets 210. In detail, the electrode sheets 210 of the battery core 20 may include a plurality of positive electrode sheets and a plurality of negative electrode sheets. The positive electrode sheets and the negative electrode sheets are arranged in a staggered manner, and adjacent electrode sheets are separated from each other by a separator. An electrolyte may be provided between the positive electrode sheet and the adjacent negative electrode sheet. The positive electrode sheet is, for example but not limited to, an aluminum foil, and the negative electrode is, for example but not limited to, a copper foil.

Each of the electrode structures M may include a battery tab stack 220, an electrode lead 30 and a welding protective layer 40. The battery tab stack 220 is connected with the electrode sheets 210, and the battery tab stack 220 includes a plurality of tabs 211. Specifically, one side of the electrode sheet 210 protrudes out of the casing 10 to form the tab 211. The tabs 211 of some electrode sheets 210 as positive electrode are stacked to form a positive battery tab stack 220 exposed to outside. The tabs 211 of some other electrode sheets 210 as negative electrode are stacked to form a negative battery tab stack 220 exposed to outside. For the purpose of illustration, FIG. 2 exemplarily depicts the battery tab stack 220 including a total of three tabs 211, while the present disclosure is not limited by the number of the tabs 211. Moreover, the battery tab stack 220 may include more than ten tabs 211. Moreover, the battery tab stack 220 may include more than twenty tabs 211.

The electrode lead 30 may be joined to one side of the battery tab stack 220, and the electrode lead 30 is, for example, but not limited to, a metal sheet with a thickness much greater than that of each electrode sheet 210. The welding protective layer 40 may be joined to another side of the battery tab stack 220, such that the electrode lead 30 and the welding protective layer 40 are located at opposite sides of the battery tab stack 220, respectively. Specifically, one electrode lead 30 and one welding protective layer 40 may be joined to the positive battery tab stack 220, and another electrode lead 30 and another welding protective layer 40 may be joined to the negative battery tab stack 220. The electrode structure M including the positive battery tab stack 220, the positive electrode lead 30 and the positive welding protective layer 40 joined to the positive battery tab stack 220 may be a positive electrode structure, as the electrode structure M on the left side in FIG. 1. The electrode structure M including the negative battery tab stack 220, the negative electrode lead 30 and the negative welding protective layer 40 joined to the negative battery tab stack 220 may be a negative electrode structure, as the electrode structure M on the right side in FIG. 1. The welding protective layer 40 may be made of metal material including at least one of copper, aluminum and nickel.

The rechargeable battery 1 in this embodiment includes the welding protective layers 40 joined to the positive electrode and the negative electrode, respectively, but the present disclosure is not limited thereto. In some other embodiments, the welding protective layer is joined to only one of the positive battery tab stack and the negative battery tab stack.

As to any electrode structure M (positive electrode structure or negative electrode structure), the electrode structure M may include a welding seam 50 extending from the welding protective layer 40 to the electrode lead 30 through the battery tab stack 220, more specifically, a positive welding seam formed in the positive electrode structure and/or a negative welding seam formed in the negative electrode structure. For the purpose of illustration, the welding seam 50 is omitted in FIG. 1. Furthermore, the rechargeable battery 1 may further include a tab tape 60. The tab tape 60 covers at least part of any electrode structure M, such that it is helpful to prevent short circuit between the electrode structure M and the casing 10.

Figure 3:
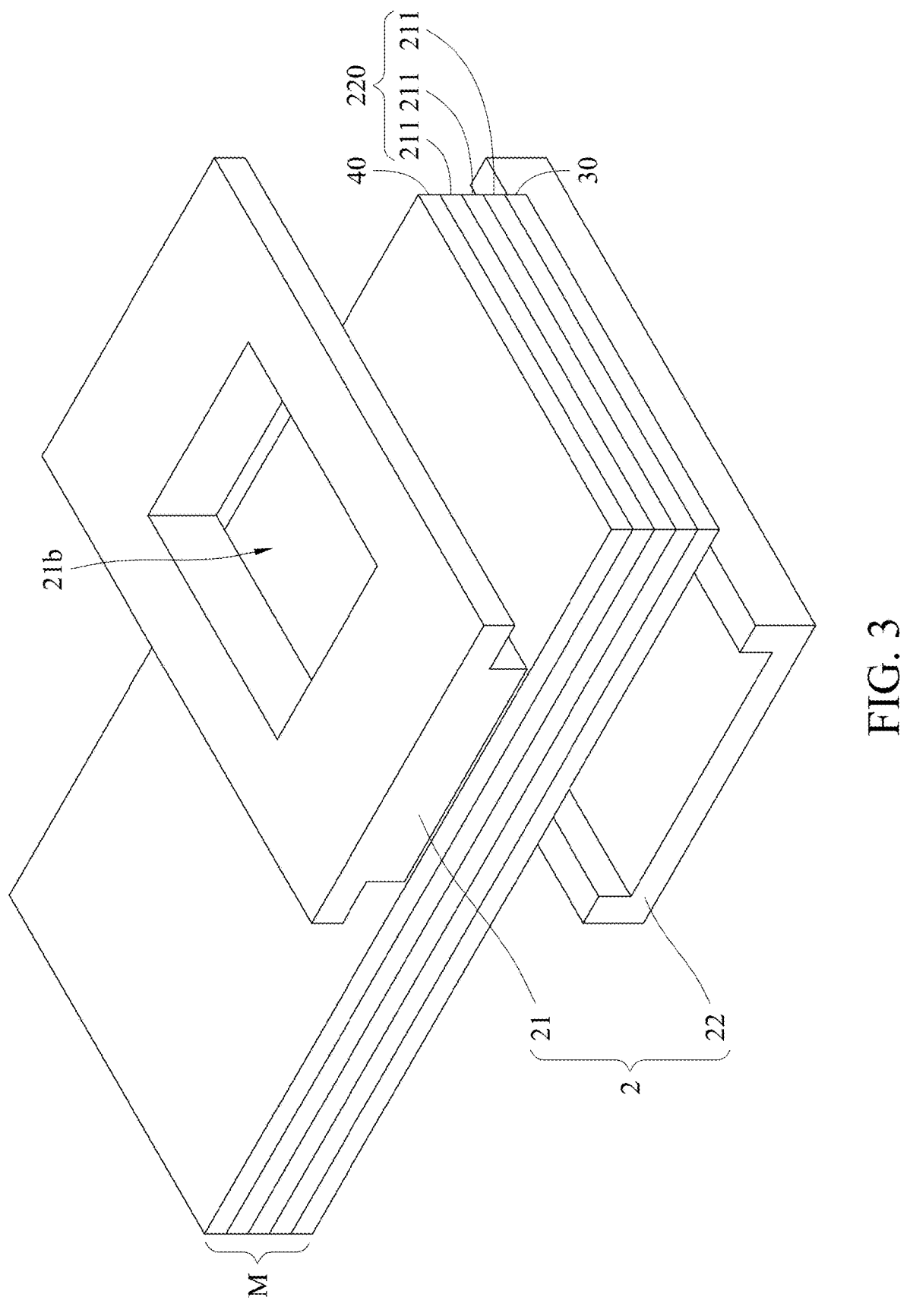
FIG. 3 through FIG. 5 are schematic views showing a lamination process performed by using a jig according to one embodiment of the present disclosure.
Figure 4:
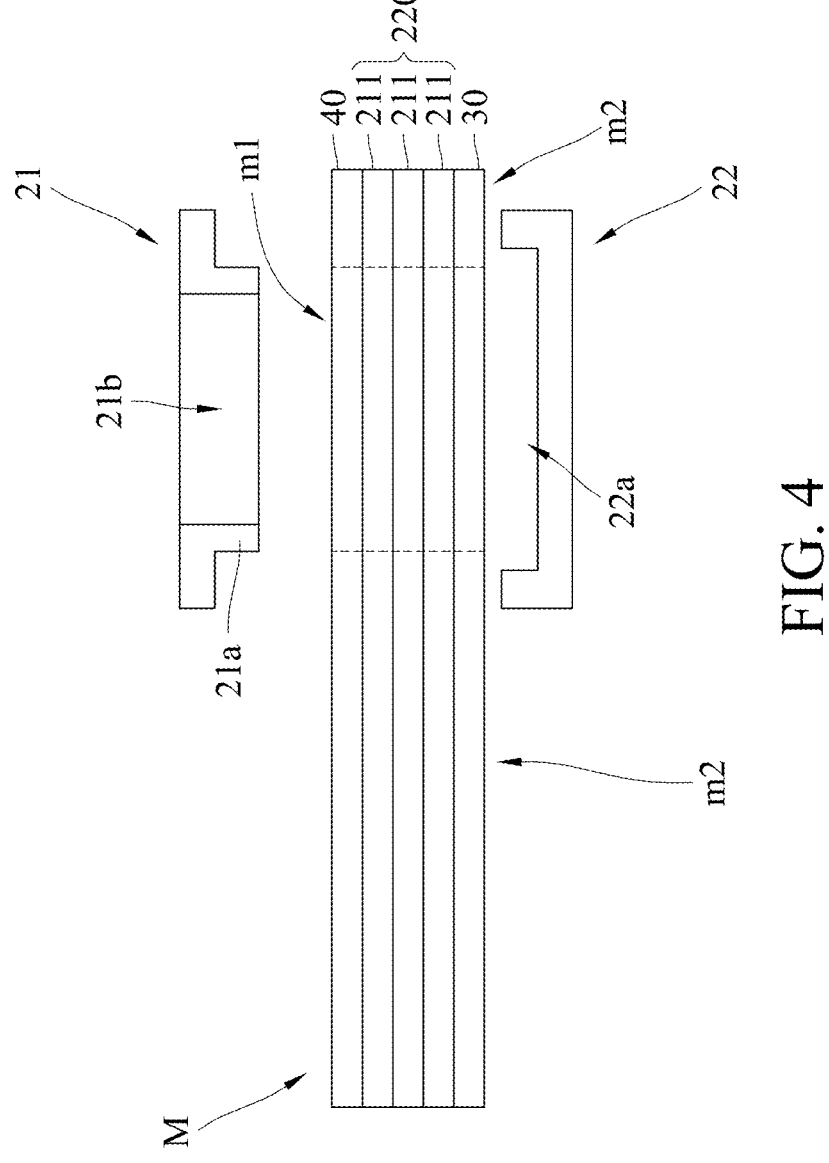
Figure 5:
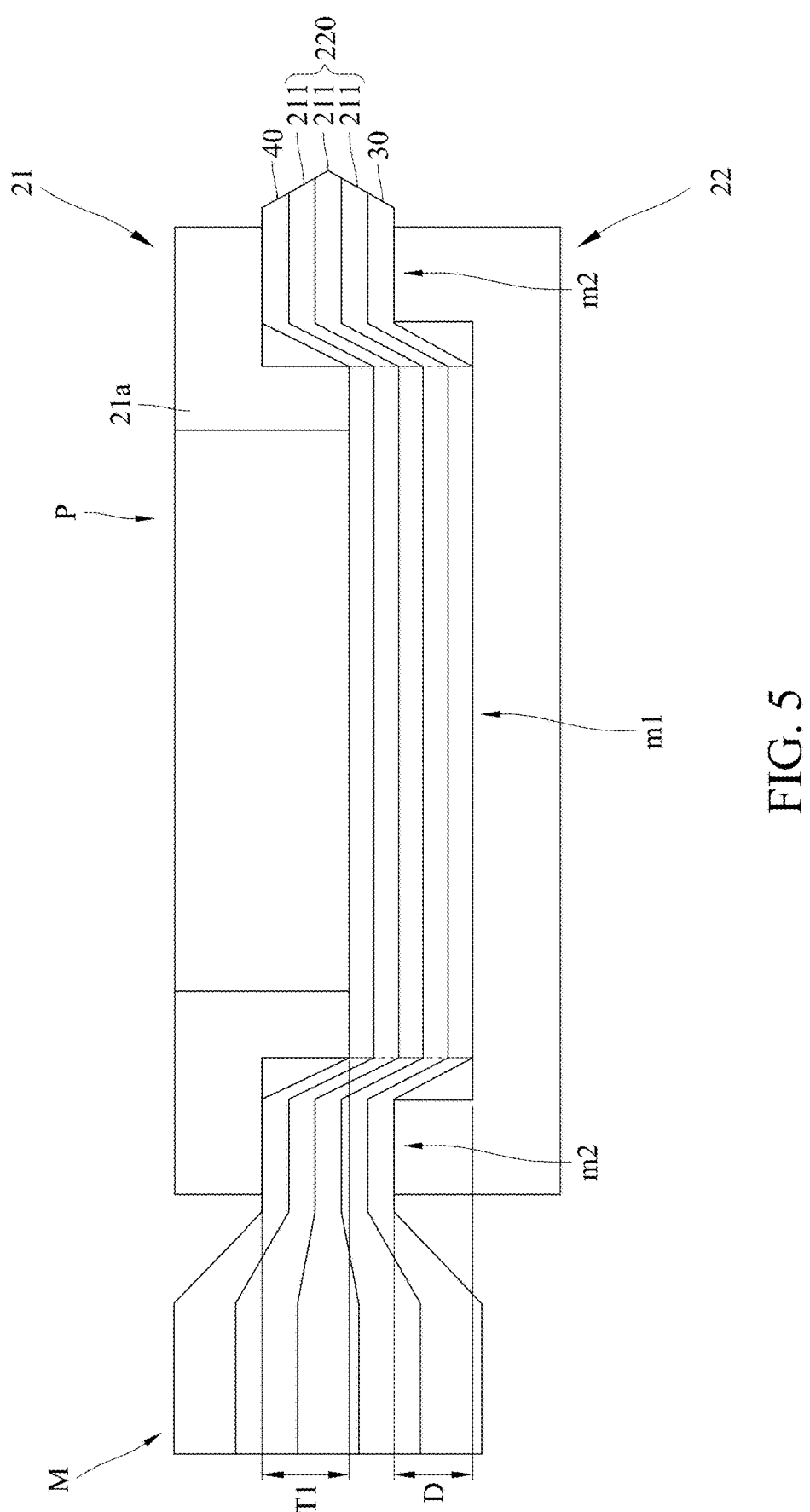
Figure 6:
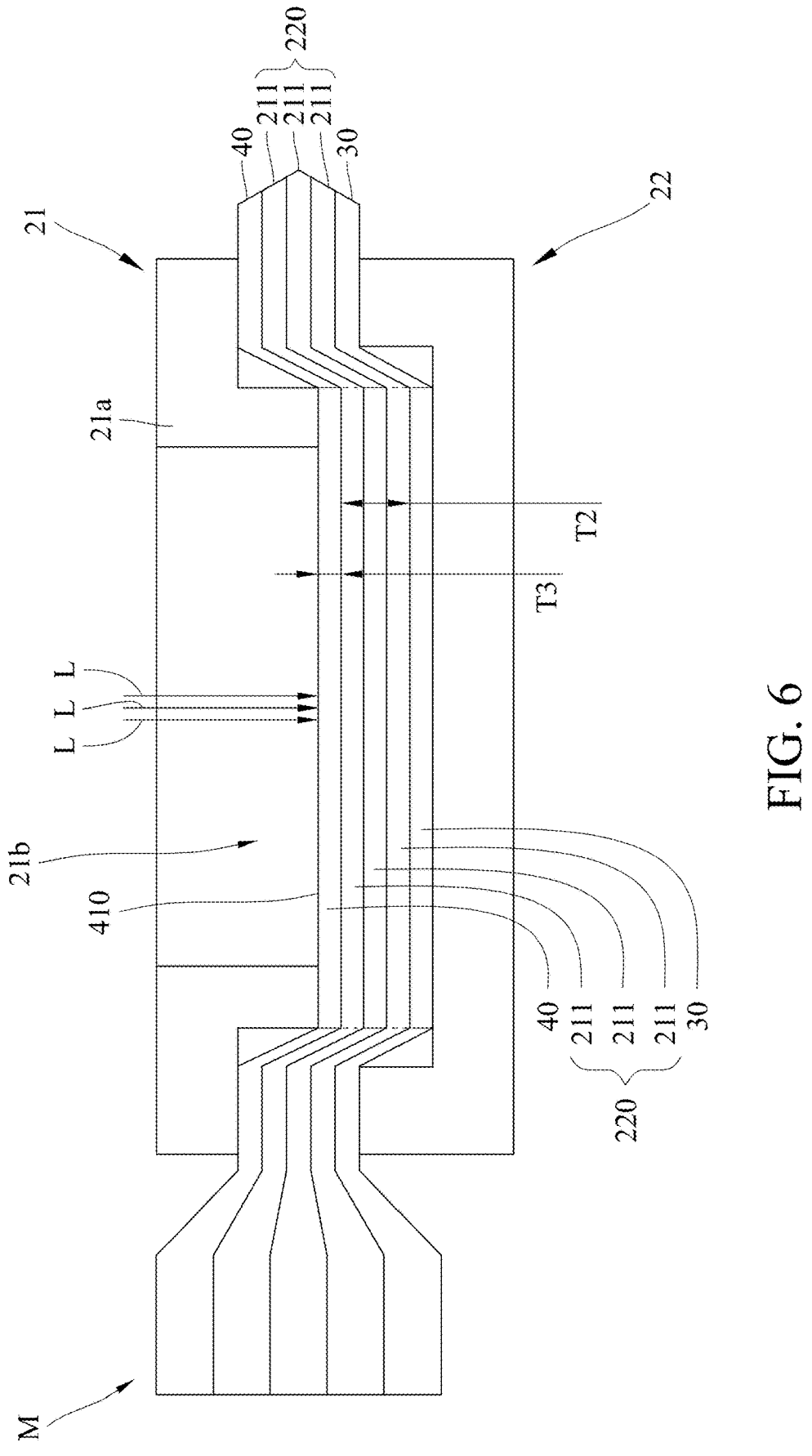
FIG. 6 and FIG. 7 are schematic views showing a laser welding process according to one embodiment of the present disclosure.
Figure 7:
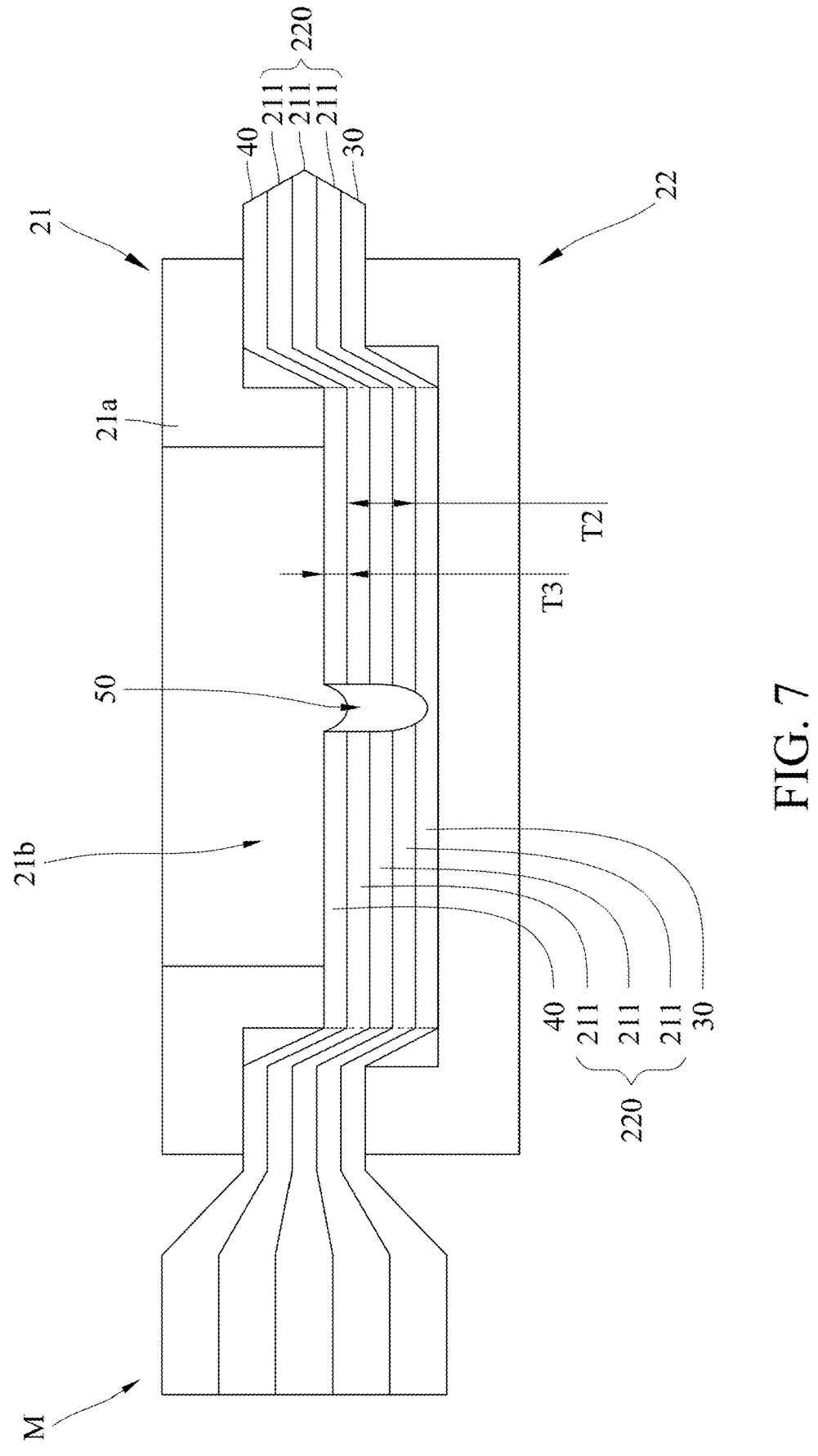

As to any electrode structure M, the battery tab stack 220, the electrode lead 30 and the welding protective layer 40 may be joined together by welding. Specifically, the battery tab stack 220, the electrode lead 30 and the welding protective layer 40 may be joined together by a laser welding process. Please refer to FIG. 3 through FIG. 7 for further details about the laser welding process. FIG. 3 through FIG. 5 are schematic views showing a lamination process performed by using a jig according to one embodiment of the present disclosure, and FIG. 6 and FIG. 7 are schematic views showing a laser welding process according to one embodiment of the present disclosure.

As shown in FIG. 3, the electrode structure M including the battery tab stack 220, the electrode lead 30 and the welding protective layer 40 is provided. The welding protective layer 40 and the electrode lead 30 are located at opposite sides of the battery tab stack 220, respectively. Herein, the tabs 211 of the battery tab stack 220 physically contact one another but have not been joined together. Similarly, the electrode lead 30 physically contacts the battery tab stack 220 but has not been joined thereto, and the welding protective layer 40 physically contacts the battery tab stack 220 but has not been joined thereto. The electrode structure M shown in FIG. 2 can be taken as a terminal connection point for positive electrode or negative electrode of the rechargeable battery 1 in FIG. 1.

Then, a lamination process is performed. In the lamination process, the battery tab stack 220, the welding protective layer 40 and the electrode lead 30 are laminated. In this embodiment, this lamination process may be implemented by using a jig 2. As shown in FIG. 3 and FIG. 4, the jig 2 may include a pressing member 21 and a carrier 22. The pressing member 21 has a protrusion 21a and a welding window 21b formed on the protrusion 21a. The carrier 22 has an accommodation groove 22a which is a counterpart of the protrusion 21a, and the electrode structure M may be accommodated in the accommodation groove 22a. As shown in FIG. 4 and FIG. 5, the pressing member 21 can be moved close to the carrier 22 so as to exert a pushing force for performing the lamination process onto the electrode structure M. In detail, the electrode structure M in FIG. 4 may be divided into a first portion m1 and a second portion m2 adjacent to the first portion m1. When the pressing member 21 is moved close to the carrier 22, the male-female matching of the protrusion 21a and the accommodation groove 22a can exert the pushing force onto the first portion m1 of the electrode structure M along a pressing direction P, such that the first portion m1 becomes concave with respect to the second portion m2 where the pushing force is not exerted. The aforementioned pushing force and/or the stress generated by the concave first portion m1 compress the tabs 211 of the battery tab stack 220, which is helpful to enhance manufacturing yield rate of a forthcoming laser welding process. Furthermore, the aforementioned pushing force can laminate the electrode lead 30, the welding protective layer 40 and the battery tab stack 220.

In FIG. 5, the first portion m1 of the electrode structure M is concave with respect to the second portion m2 thereof by a depth D due to the compression by the jig 2. In this embodiment, in order to obtain better lamination quality, the protrusion 21a of the jig 2 has a thickness T1 which is twice a thickness of any tab 211 or less. For example, the thickness of single tab 211 may be 0.050 millimeter (mm), the thickness T1 of the protrusion 21a may be 0.10 mm or less, and the depth D of the concave first portion m1 is also 0.10 mm or less. The specific thickness range of the protrusion 21a of the jig 2 is helpful to achieve better lamination that meets process requirements and prevent fractures of the tabs 211 due to excessive deformation and pulling.

After the lamination process is completed, a laser welding process is performed. In the laser welding process, a laser L is delivered along a direction from the welding protective layer 40 toward the electrode lead 30 so as to join the battery tab stack 220 to the welding protective layer 40 and the electrode lead 30. As shown in FIG. 6 and FIG. 7, in a condition that the jig 2 compresses the electrode structure M, the welding window 21b formed on the pressing member 21 allows the implementation of the laser welding process. That is, the laser L can travel through the welding window 21b to thereby reach the outer surface 410 of the welding protective layer 40. The laser L heats the welding protective layer 40 and part of the battery tab stack 220 adjacent to the welding protective layer 40, thereby fusing the welding protective layer 40 with the battery tab stack 220. The outer surface 410 of the welding protective layer 40 may have a recess due to laser bombardment. Also, the laser L heats the electrode lead 30 and another part of the battery tab stack 220 adjacent to the electrode lead 30, thereby fusing the electrode lead 30 with the battery tab stack 220. A welding seam 50 is formed by the laser welding process, and the welding seam 50 extends from the welding protective layer 40 through the battery tab stack 220, more specifically, from the welding protective layer 40 to the electrode lead 30.

The aforementioned laser welding process may be implemented by a continuous delivery of energy provided by the laser L. Specifically, the laser L may be a continuous wave laser (CW laser) instead of pulsed laser. The laser L may continuously irradiate so as to form the welding seam 50 consisting of single weld run. In other words, during the laser welding process, the battery tab stack 220, the electrode lead 30 and the welding protective layer 40 can be joined together by single-pass laser welding. The welding protective layer 40 can absorb heat generated by the laser welding such that it is helpful to prevent deformation of the battery tab stack 220 due to long time laser irradiation.

As shown in FIG. 6 and FIG. 7, the ratio of the thickness of the welding protective layer 40 to the thickness of the battery tab stack 220 may be from ½ to ⅛. Therefore, it allows the welding protective layer 40 to effectively absorb excess heat generated by laser welding. Moreover, the ratio of the thickness of the welding protective layer 40 to the thickness of the battery tab stack 220 may be from ½ to ⅛. In this embodiment, as to a set of the battery tab stack 220 and the welding protective layer 40 which are joined together, a thickness T2 of the battery tab stack 220 may be 1.0 mm, and a thickness T3 of the welding protective layer 40 may be 0.20 mm or more.

After the laser welding process, the positive electrode structure or the negative electrode structure can be obtained by removing the pressing member 21 and the carrier 22 of the jig 2. The concave first portion m1 caused by compression will be recovered by its own elastic recovery force after the jig 2 is removed, and thus the electrode structure M becomes flat.

Figure 8:
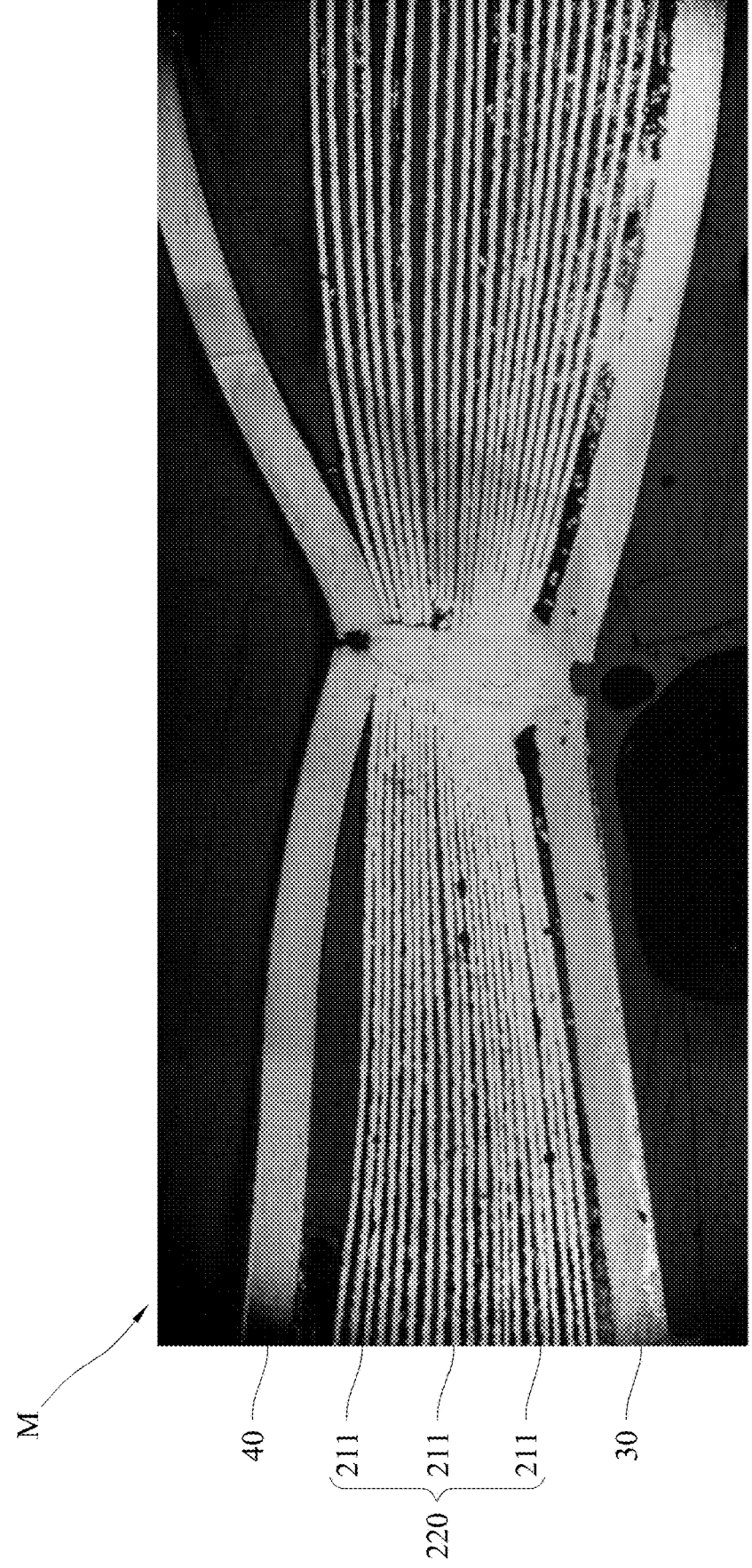
FIG. 8 is an image of an electrode structure fabricated by the laser welding process according to one embodiment of the present disclosure.

FIG. 8 is an image of an electrode structure fabricated by the laser welding process according to one embodiment of the present disclosure. In one embodiment, a copper welding protective layer 40, a battery tab stack 220 including nickel tabs 211 and a copper electrode lead 30 are joined together to form an electrode structure M by single-pass laser welding. A laser with a wavelength of 1070 nm and an energy of 2400 W may be used in the single-pass laser welding. The processing speed (or called welding speed) of the laser welding process may be 250 mm per second. Furthermore, the battery tab stack 220 in the electrode structure M may consist of twenty layers of tabs 211, the thickness of each tab 211 may be 0.050 mm, and the thickness of the battery tab stack 220 may be 1.0 mm. Each of the electrode lead 30 and the welding protective layer 40 may have a thickness of 0.20 mm.

According to the present disclosure, multiple tabs are joined together to form a battery tab stack by a laser welding process with a welding protective layer. The welding protective layer is helpful to prevent deformation of the battery tab stack due to heat accumulation during the laser welding process.

Furthermore, compared to the conventional method in which a step of joining the tabs by an ultrasonic welding process and another step of joining the tabs to the electrode lead by a laser welding process, the tabs and the electrode lead are joined together by a laser welding process in the present disclosure, which is helpful to reduce process time. For example, the ultrasonic welding process used in the conventional method may take about 6 seconds, and the laser welding process used in the conventional method may take about 14 seconds, such that the welding of the tabs to the electrode lead may take a total of about 20 seconds. In contrast, as to the laser welding process disclosed in the present disclosure, it takes less than 2 seconds of laser irradiation to join the tabs to the electrode lead.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A method for joining battery tab stack to electrode lead for rechargeable battery, comprising:
   providing a multilayer structure comprising a battery tab stack, a welding protective layer and an electrode lead, wherein the welding protective layer and the electrode lead are located at opposite sides of the battery tab stack, respectively;
   performing a lamination process, wherein the battery tab stack, the welding protective layer and the electrode lead are laminated; and
   performing a laser welding process, wherein a laser is delivered along a direction from the welding protective layer toward the electrode lead to join the battery tab stack to the welding protective layer and the electrode lead;
   wherein in the lamination process, a pushing force is exerted onto a first portion of the multilayer structure in a pressing direction, such that the first portion is concave with respect to a second portion of the multilayer structure where the pushing force is not exerted.

2. The method for joining battery tab stack to electrode lead for rechargeable battery according to claim 1, wherein the battery tab stack comprises a plurality of tabs, the first portion of the multilayer structure is concave with respect to the second portion by a depth, and the depth is twice a thickness of any one of the plurality of tabs or less.

* * * * *